United States Patent
Rune (12) 
(10) Patent No.: US 6,181,940 B1
(45) Date of Patent: Jan. 30, 2001

(54) METHODS AND APPARATUS FOR LOCATION AREA SCHEME NEGOTIATION IN COMMUNICATIONS SYSTEMS

(75) Inventor: Johan Rune, Lidingö (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/021,378

(22) Filed: Feb. 10, 1998

(51) Int. Cl.[7] ................................................. H04Q 7/20
(52) U.S. Cl. ................................................. 455/435; 455/432
(58) Field of Search ................................. 455/432, 434, 455/435, 426, 532, 553, 456

(56) References Cited

U.S. PATENT DOCUMENTS

| | | |
|---|---|---|
| 4,672,657 | 6/1987 | Dershowitz . |
| 5,412,375 | 5/1995 | Wood . |
| 5,452,287 | 9/1995 | DiCecco et al. . |
| 5,548,816 | 8/1996 | DeVaney . |
| 5,574,728 | 11/1996 | Mamaghani et al. . |
| 5,590,397 | 12/1996 | Kojima . |
| 5,592,512 | 1/1997 | Spiess . |
| 5,638,412 | 6/1997 | Blakeney, II et al. . |
| 5,642,398 | * 6/1997 | Teidemann, Jr. et al. ............ 455/435 |
| 5,710,805 | 1/1998 | Armbruster et al. . |
| 5,832,381 | * 11/1998 | Kauppi ................................. 455/435 |
| 5,842,127 | * 11/1998 | Pashtan et al. ...................... 455/435 |
| 5,850,604 | * 12/1998 | Dufour et al. ........................ 455/435 |

FOREIGN PATENT DOCUMENTS

| | | |
|---|---|---|
| 0667725A2 | 8/1995 | (EP) . |
| 96/34504 | 10/1996 | (WO) . |
| WO96/38989 | 12/1996 | (WO) . |
| WO97/34438 | 9/1997 | (WO) . |

OTHER PUBLICATIONS

Aura Ganz et al., "On Optimal Design of Multitier Wireless Cellular Systems", IEEE Communications Magazine, Feb. 1997, pp. 88–93.

Ivan Seskar et al., "Rate of Location Area Updates in Cellular Systems", BNR, 1992 IEEE, Richardson, Texas, pp. 694–697.

(List continued on next page.)

*Primary Examiner*—Edward F. Urban
(74) *Attorney, Agent, or Firm*—Burns, Doane, Swecker & Mathis, L.L.P.

(57) ABSTRACT

Methods and apparatus allow a communications network and a mobile terminal to dynamically negotiate for a preferred location area registration scheme, a preferred communications protocol and/or a preferred communications standard. As a result, differently configured equipment can coexist within a single network, and advanced schemes, protocols and/or standards can be gradually introduced into implemented systems. According to an exemplary embodiment, a mobile terminal and a network negotiate, upon an initial registration of the terminal with the network, for a location area registration scheme to be used for tracking terminal movement. In the embodiment, available location area registration schemes are numbered according to complexity level, and numbers corresponding to schemes which the terminal and the network can implement are used to negotiate a preferred, mutually acceptable scheme. When the terminal enters an area in which the prevailing scheme is no longer supported, or where the prevailing scheme is no longer the best available scheme, the terminal and the network renegotiate for a new best, mutually agreeable scheme.

20 Claims, 4 Drawing Sheets

OTHER PUBLICATIONS

Lon–Rong Hu et al., "An Adaptive Location Management Scheme for Global Personal Communications", Dept. of Electrical Engineering, State University of New York, pp. 1–25.

Sadaatsu Okasaka et al., "A New Location Updating Method for Digital Cellular Systems", 1991 IEEE, NTT Mobile Communications Division, 1–2356, Take, Japan, pp. 345–350.

Hanna–Maria Kauppi et al., "Advanced Location Management for UMTS", Jun. 1993, pp. 0112–0115.

Seshu Madhavapeddy et al., "Adaptive Paging Algorithms for Cellular Systems", Bell Northern Research, Richardson, Texas, pp. 347–361 (Date unknown).

D. Plassman, "Location Management Strategies for Mobile Cellular Networks of $3^{rd}$ Generation", 1994 IEEE, Aachen University of Technology, pp. 649–653.

Timothy X. Brown et al., "Mobility Management for Personal Communications Systems", pp. 1–17 (Date and source unknown).

* cited by examiner

METHODS AND APPARATUS FOR LOCATION AREA SCHEME NEGOTIATION IN COMMUNICATIONS SYSTEMS

BACKGROUND OF THE INVENTION

The present invention relates to communications systems, and more particularly to location area registration in communications systems.

Wireless communications networks of today continually track mobile terminal movement within an overall network coverage area so that incoming traffic can be routed to intended mobile terminal destinations quickly and efficiently. Such tracking is typically accomplished by way of mobile terminal location updates or registrations. In other words, each mobile terminal within a network coverage area typically notifies the network whenever the mobile terminal changes location.

In order to reduce the frequency of location updates and to thereby reduce the associated processing overhead, the overall coverage area of a network is typically divided into multiple location areas within which mobile terminals can move around without having to notify the network. In practice, the size of each location area represents a trade off between the traffic load caused by location updates and that caused by the paging required to notify mobile terminals of incoming traffic. Generally, the larger a location area is, the fewer location updates are required to track mobile terminal movement and the more base stations are involved in paging.

Today, most cellular systems use a single set of static location areas for every terminal within a network. The more advanced schemes (e.g., Personal Digital Cellular or PDC) use overlapping location areas and track hysteresis at the area borders to provide different terminals with different effective location areas. The overlapping location areas are nonetheless of fixed shape and size. Since the optimal shape and size of a location area is ultimately dependent upon terminal type and terminal user behavior, as well as the particular application a terminal user is running, location areas are ideally customized specifically for each user and/or for each terminal. Several schemes for customizing location areas for specific terminals are being developed at the research level.

No matter which particular type of location area scheme is preferred, however, conventional techniques permit only one type of location area scheme to be employed within a given system or network. In other words, to achieve compatibility across a given system or network, all equipment within the system or network is constructed consistently to utilize a single, common location area registration scheme. Equipment utilizing different types of location area registration cannot coexist, and varying levels of location area registration complexity cannot be achieved.

As a result, today's networks are difficult to upgrade. In other words, since all equipment within a network must utilize a common location area registration scheme, all network equipment must be upgraded simultaneously. Also, because such network-wide upgrades can be prohibitively costly and protracted, it is often difficult to introduce a more advanced location area registration scheme or to standardize an improved location area algorithm. For example, since tremendous effort must be put forth to implement even the first version of a new standard, the proposed customized-location area schemes described above have been less attractive than they would otherwise be to standardization bodies. As a result, the significant advantages provided by such schemes are presently being under utilized.

Furthermore, known techniques for implementing location area registration schemes are not suitable for the flexible and powerful "universal" networks being proposed today. For example, PCT Publication No. 96/34504, published Oct. 31, 1996 and entitled "Method and Arrangement for Increasing the Range for a Telecommunication Network in a Telecommunications System" (and corresponding to PCT Application No. PCT/SE96/00510 filed Apr. 18, 1996), describes a Generic Radio Access Network (GRAN) which is now being targeted for standardization by the European Telecommunications Standards Institute (ETSI) in the Universal Mobile Telecommunications System (UMTS) standardization work.

The Generic Radio Access Network, now also known in the art as the UMTS Radio Access Network (URAN), provides a generic interface to which any type of service network can connect. Future service networks can be tailored to explicitly fit the generic interface, and existing service networks (e.g., the Global System for Mobile Communications (GSM), the Integrated Services Digital Network (ISDN), the Public Switched Telephony Network (PSTN), etc.) can utilize an appropriate intermediary or interworking function (IWF). Terminals used to access the Generic Access Radio Network are divided logically into two parts, one part logically belonging to the Generic Radio Access Network itself and another part logically belonging to a particular service network to which the terminal user subscribes.

The Generic Radio Access Network itself has no direct subscribers. Rather, terminal users subscribe to services within their respective service networks, and the service networks in turn connect with generic bearer services offered by the Generic Radio Access Network. The service networks then use the bearer services to connect with their subscribers and thereby extend the range of their networks and provide increased mobility to their subscribers.

To provide these advantages, the bearer services offered by the Generic Radio Access Network are extremely flexible and are capable of providing diverse signaling and traffic connections that match those of the many existing and yet to be developed service networks which will ultimately utilize the Generic Radio Access Network. By way of contrast, the above described conventional techniques for implementing location area registration schemes are inflexible and therefore inadequate in the context of universal networks such as the Generic Radio Access Network. In other words, since universal networks are designed to allow differently configured equipment to coexist, conventional techniques requiring that all equipment be uniformly configured to utilize a common registration scheme are inapplicable.

Thus, there is a need for improved methods and apparatus for implementing location area registration schemes in communications systems.

SUMMARY OF THE INVENTION

The present invention fulfills the above-described and other needs by providing methods and apparatus for allowing a communications network and a mobile terminal to dynamically negotiate for a preferred location area registration scheme. Thus, the invention enables differently configured equipment to coexist within a network and thereby allows for the gradual introduction of new and sophisticated location area schemes into implemented and still developing communications systems and standards. Advantageously, multiple location area registration schemes, each representing a different level of sophistication, effectiveness and complexity, can be simultaneously utilized within a single communications system and/or standard.

According to the invention, a mobile terminal and a network negotiate, at an initial registration of the terminal with the network (e.g., at first contact between the terminal and the network, or when the terminal is first powered up within the network coverage area), for a location area registration scheme to be used for tracking terminal movement. According to exemplary embodiments, available location area registration schemes are numbered (e.g., from 0 to N according to complexity, with 0 for example representing the simplest available scheme and N representing the most complex), and the numbers corresponding to the schemes which the terminal and the network can implement are used to negotiate a preferred, mutually acceptable scheme.

The disclosed techniques for negotiating a mutually acceptable level of scheme complexity and sophistication are extremely useful when a new communications standard is introduced. For example, the first implementation of a new standard can use lower levels of complexity, and higher levels of complexity can then be introduced gradually into networks and terminals as time and resources permit. Further, new algorithms can be introduced within a standard as work with the algorithms continues and as experience with respect to algorithm efficiency in already implemented systems is gained.

The disclosed negotiation techniques are also particularly useful for effecting partial network upgrades. Partial upgrading can be preferable, for example, where an improvement is necessary in a particular part of a network (e.g., to relieve a particularly heavy paging, traffic or location registration burden), but where an overall network upgrade would be prohibitively expensive or untimely. Advantageously, the present invention allows different location area registration schemes to coexist within such a partially upgraded system.

According to a first exemplary embodiment, a number indicating a highest level of location area registration that a mobile terminal can implement is sent from the mobile terminal to a communications network upon an initial registration of the mobile terminal with the network. The number is received at the network and compared with another number indicating a highest level of location area registration that the network can implement. If, based on the comparison, the network determines that it can implement the highest level of registration implementable by the terminal (i.e., the network's number is greater than or equal to the network's number), then the network sends an acceptance message back to the terminal. However, if the network determines that it cannot implement the highest level of registration implementable by the terminal (i.e., the network's number is less than the terminal's number), then the network sends its own (lower) number back to the terminal. The result of the negotiation (i.e., the lower of the two numbers) is then stored at the terminal and at the network, and the corresponding location area registration scheme is thereafter used to track movement of the terminal.

According to a second exemplary embodiment, one or more numbers are sent from the mobile terminal to the network upon initial registration by the mobile terminal, wherein each number indicates a level of location area registration the terminal can implement. The number(s) are received at the network and are compared with one or more other numbers, wherein each other number indicates a level of location area registration the network can implement. Then, if the network and the terminal can both implement at least one common level of location area registration, an acceptance message including a result number (which indicates a highest level of location area registration that both the terminal and the network can implement) is sent from the network back to the terminal, and the location area registration scheme corresponding to the result number is used to track movement of the terminal. Otherwise, a reject message is sent from the network to the terminal.

According to a third exemplary embodiment, a first number is sent from the mobile terminal to the network upon initial registration by the terminal, wherein the first number indicates a single specific level of location area registration the terminal can implement. The first number is received at the network and compared with at least one other number, wherein each other number indicates a level of location area registration the network can implement. If the network can implement the single specific level of location area registration, an acceptance message is sent from the network back to the terminal and the specific level of location area registration is used to track terminal movement. Otherwise, a reject message is sent from the network to the terminal.

Advantageously, once a location area registration scheme has been negotiated according to any of the above described embodiments, either the network or the terminal can initiate a renegotiation of registration scheme should the terminal enter an area in which the network cannot support the prevailing (previously negotiated) scheme, or in which the network can support a more sophisticated scheme which the terminal can also implement. For example, according to one embodiment of the invention, a location update request is sent from the terminal to the network in accordance with a prevailing (i.e., previously negotiated) location area registration scheme when the terminal enters a coverage area in which the network does not support the prevailing location area registration scheme. The location update request is received at the network, and a location update reject message is sent from the network back to the terminal. When the location update reject message is received at the terminal, the terminal initiates a renegotiation of location area registration scheme with the network, and a newly negotiated location area registration scheme is thereafter used to track movement of the terminal. Alternatively, the network itself can initiate the renegotiation of registration scheme when sending the reject message.

According to another exemplary embodiment, when the terminal enters a coverage area in which the network supports a level of location area registration which is higher than that of a currently implemented (i.e., previously negotiated) location area registration scheme, a location update request is sent from the terminal to the network in accordance with the currently implemented scheme. When the location update request is received at the network, the network compares stored negotiation information (relating to levels of location area registration supported by the terminal) with levels of location area registration supported by the network within the entered coverage area. When the terminal and the network can both implement a level of location area registration within the entered coverage area which is higher than the level of the currently implemented location area registration scheme, a message instructing the terminal to begin implementing the higher level of location area registration is sent from the network to the terminal.

Advantageously, the above described aspects of the invention can be generalized to provide for negotiation of system aspects other than location area registration scheme. For example, a mobile terminal and a network can negotiate for a particular communications protocol (e.g., the Call Control and/or Radio Resource Control protocols). Indeed, according to the invention, a mobile terminal and a network can negotiate for the entire standard by which they ultimately communicate. For example, a range of numbers can be assigned to the various versions of a known standard in a manner analogous to that described above with respect to the various levels of complexity for location area registration schemes. Doing so facilitates the introduction of new versions of a standard since multiple versions of the standard can coexist within a single network and since newer versions of the standard need not be backward compatible with older versions.

The above described and additional features of the present invention are explained in greater detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE EXEMPLARY EMBODIMENTS

Figure 1:
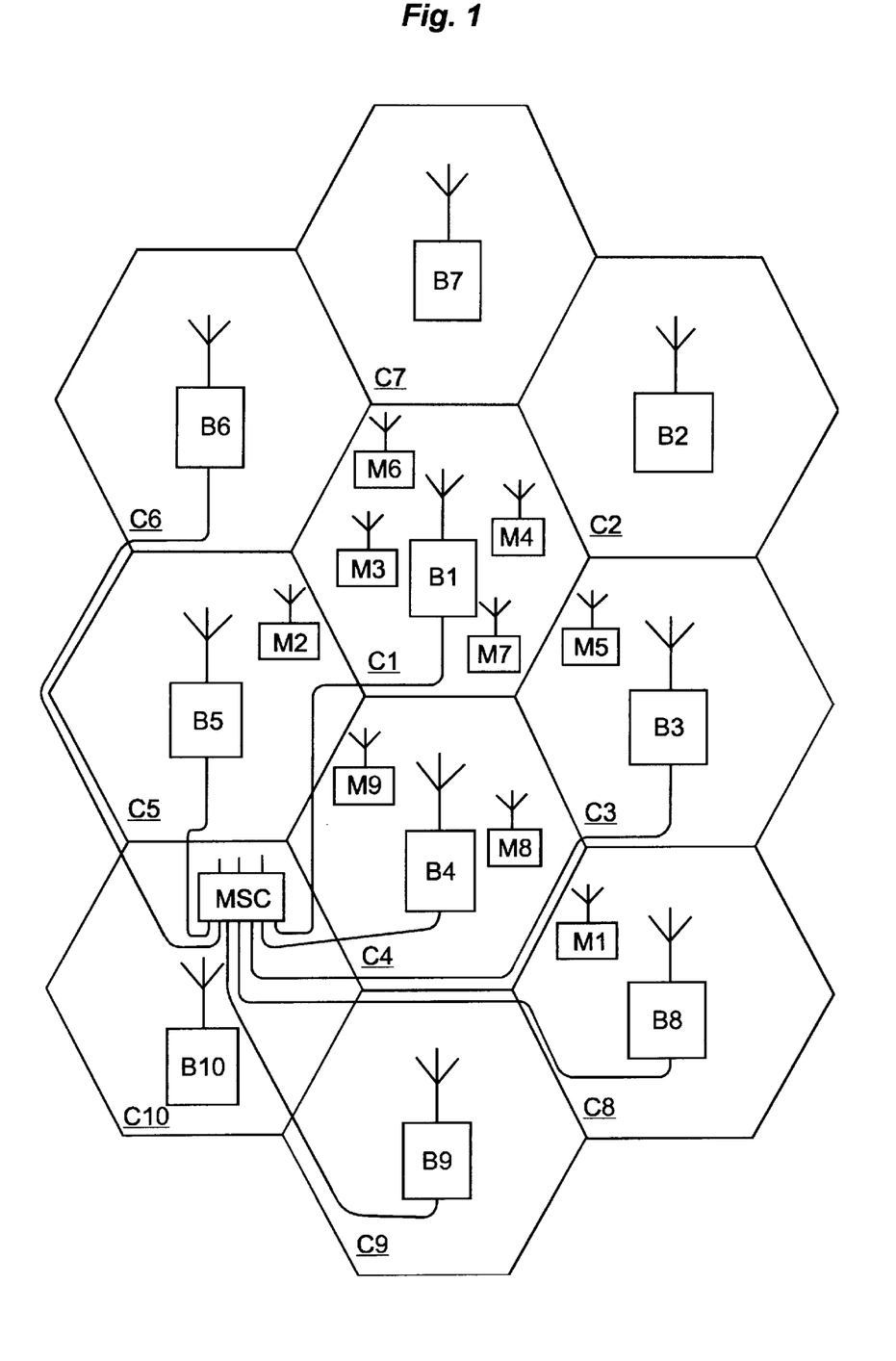
FIG. 1 depicts an exemplary communications system in which the methods of the present invention can be utilized.

FIG. 1 depicts a wireless mobile radio communications system in which the teachings of the present invention can be utilized. As shown, the system includes a plurality of cells C1–C10, a plurality of base stations B1–B10, and a plurality of mobile stations M1–M9. Each base station B1–B10 provides coverage for a corresponding cell C1–C10, and each mobile station M1–M9 is free to move within a cell and from one cell to another. A mobile switching center MSC is coupled to each of the base stations B1–B10 and also to a public switched telephone network (not shown). The mobile switching center MSC, the base stations B1–B10, and the mobile stations M1–M9 are all computer controlled and permit both mobile-to-mobile and mobile-to-landline communication. Since conventional operation of the system of FIG. 1 is well known, a detailed description of the same is omitted. Those skilled in the art will appreciate that the simplified system of FIG. 1 is provided by way of example only and that the teachings of the present invention are readily applicable to virtually any wireless communications system.

Figure 2:
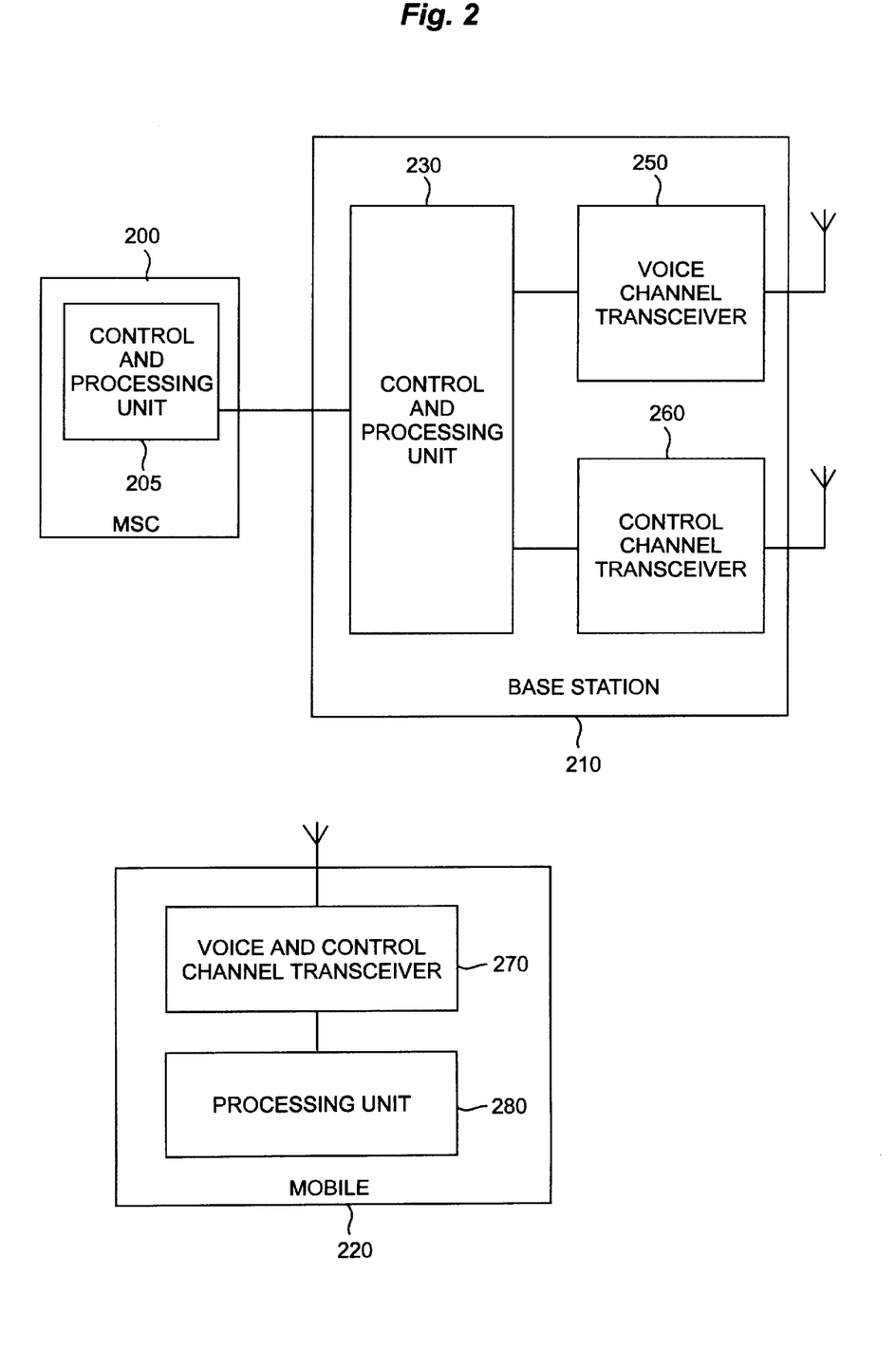
FIG. 2 depicts exemplary components within a mobile switching center, a base station and a mobile station in a communications system such as that of FIG. 1, wherein the depicted components can be configured to implement the methods of the present invention.

FIG. 2 depicts basic components which can be included in the mobile switching center MSC, the base stations B1–B10 and the mobile stations M1–M9 of the exemplary system of FIG. 1. Advantageously, the depicted components can be configured to implement the methods of the present invention. Those skilled in the art will appreciate that the components of FIG. 2 are provided by way of example only and that the teachings of the present invention can be implemented using any appropriate configuration.

As shown, an exemplary mobile switching center 200 includes a control and processing unit 205, and an exemplary base station 210 includes a control and processing unit 230, a voice channel transceiver 250 and a control channel transceiver 260. Additionally, an exemplary mobile station 220 includes a voice and control channel transceiver 270 and a processing unit 280. As with the system of FIG. 1, basic operation of the components of FIG. 2 is well known, and a detailed description of the same is omitted here.

Briefly, the base station 210 utilizes a plurality of assigned voice or traffic channels and one or more assigned control channels to permit communication by mobile stations located within an area for which the base station 210 provides coverage. The control channel transceiver 260 broadcasts control information to mobile stations which are locked onto the assigned control channel(s), and the voice channel transceiver 250 broadcasts and receives voice or data (and perhaps additional control information as well) to and from the mobile stations via the plurality of assigned voice or traffic channels. Operation of the voice and control channel transceivers 250, 260 is controlled by the base station control and processing unit 230.

The control information broadcast by the base station 210 typically includes details relating to prevailing conditions in the base station coverage area and/or adjacent coverage areas. The mobile station 220 can thus periodically scan the control channels of proximate base stations to determine which base station or coverage area it should lock on or camp to. When the mobile station 220 is camped in a particular coverage area, it can communicate via the voice or traffic channels assigned to that coverage area. The mobile station 220 transmits and receives control and voice or traffic information via the voice and control channel transceiver 270 (the operation of which is controlled by the mobile station processing unit 280).

As shown, the mobile switching center 200 and the base station 210 are coupled via the switching center and base station control and processing units 205, 230. The switching center control and processing unit 205 is also typically coupled to a Public Switching Telephony Network (PSTN) as is well known in the art. Thus, mobile stations camped to the base station 210 can communicate with landline stations as well as other mobile stations as is described above with respect to FIG. 1.

Figure 3:
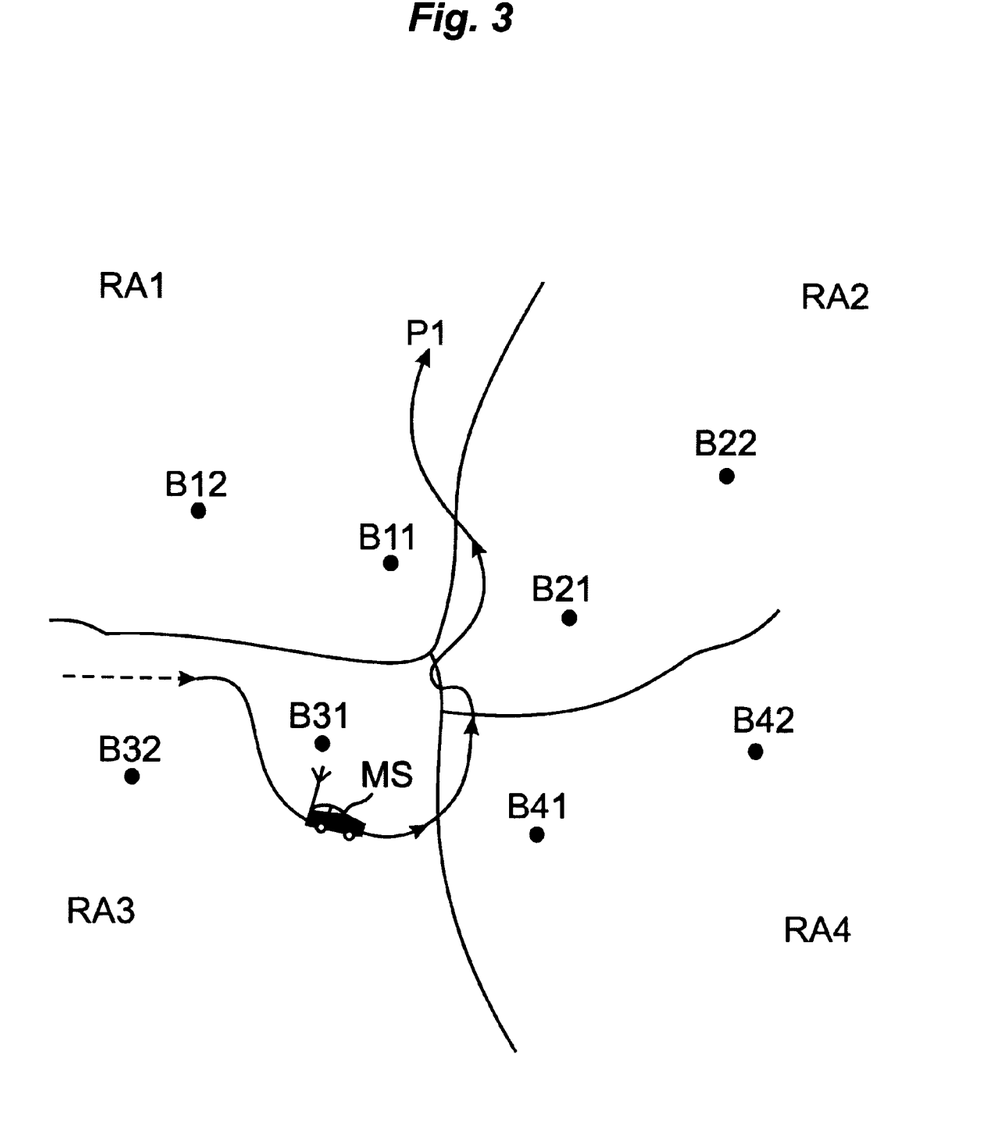
FIG. 3 depicts one of many possible location area registration schemes which can be selectively utilized, according to the methods of the present invention, in a system such as that of FIG. 1.

FIG. 3 depicts a basic location area registration scheme which can be implemented, for example, using the exemplary components of FIG. 2 in the exemplary system of FIG. 1. In FIG. 3, an overall network coverage area is divided into four fixed and non-overlapping location registration areas RA1–RA4, each registration area including a pair of base stations (B11–B12, B21–B22, B31–B32, B41–B42). As shown, a mobile station MS is free to move about within the overall network coverage area and can thus contact each of the registration areas in a random order. So long as the mobile station remains within a particular registration area, the mobile station need not report its location to the network, and paging of the mobile is accomplished via the base stations within that particular registration area. However, upon first entering (or re-entering) another registration area, the mobile station must register its location with the network. For example, when the mobile station MS follows a random path, designated P1 in FIG. 3, it successively registers six times (with registration areas RA3, RA4, RA2, RA3, RA2 and RA1, respectively).

The basic location area registration scheme of FIG. 3 is just one of many possible registration schemes. Other schemes include fixed location areas with a location area identifier broadcast in each cell (as, for example, in GSM) and fixed overlapping location areas with sets of location area identifiers broadcast in each cell (as, for example, in PDC). Additionally, advanced methods for providing customized location registration areas are being developed at the research level. Details regarding known methods for location area registration are provided, for example, in: I. Seskar, S. Maric, J. Holtzman and J. Wasserman, Rate of Location Area Updates in Cellular Systems, Institute of Electrical and Electronics Engineers (IEEE) Publication No. 0-7803-0673-2, 1992; S. Okasaka, S. Onoe, S. Yasuda and A. Maebara, A New Location Updating Method for Digital Cellular Systems, IEEE Publication No. CH2944-7/91/ 0000/0345, 1991; and D. Plassmann, Location Management Strategies for Mobile Cellular Networks of 3rd Generation, IEEE Publication No. 0-7803-1927-3/94, 1994.

While many types of location area registration exist, conventional systems employ only a single type of scheme at a time. Different schemes cannot coexist within a single network. As a result, conventional systems cannot be easily upgraded, and new standards cannot be easily implemented. Advantageously, the present invention provides methods and apparatus by which multiple location area registration schemes can be utilized simultaneously within a single network. More specifically, the invention teaches that a location area registration scheme which is to be utilized by a particular mobile terminal within a network can be negotiated upon initial contact between the terminal and the network.

Figure 4:
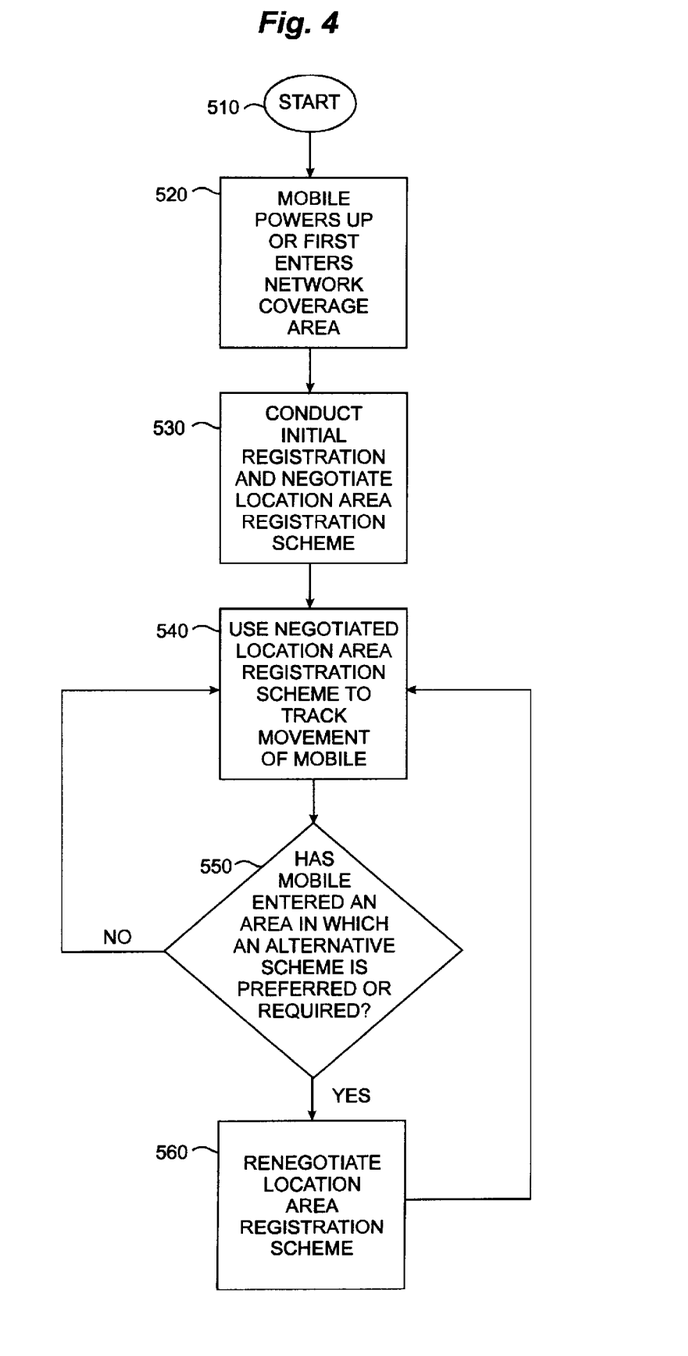
FIG. 4 depicts an exemplary method of location area registration scheme negotiation and renegotiation according to the invention.

FIG. 4 depicts the basic steps in a method of registration scheme negotiation between a mobile terminal and a network according to the invention. As shown, the process starts at step S10, and the mobile terminal makes first contact with the network at step S20 (e.g., when the mobile terminal is first powered up within the network coverage area or first roams into the network coverage area). At step S30, the mobile terminal initially registers with the network (e.g., using conventional methods), and the mobile terminal and the network negotiate for an optimal, mutually agreeable location area registration scheme. Thereafter, at step 540, the mobile terminal and the network adhere to the agreed upon location area registration scheme to track movement of the terminal within the network coverage area. As shown at steps S50 and S60, the terminal and the network continue to utilize the negotiated location area registration scheme until the terminal moves into a portion of the network in which the prevailing scheme is no longer appropriate (e.g., where the network no longer supports the prevailing scheme or supports a scheme which is superior to the prevailing scheme and which the terminal also supports). At that time, the terminal and the network renegotiate for a new best, mutually agreeable scheme and thereafter use the newly negotiated scheme to track movement of the terminal.

Thus, according to the invention, different terminals within the same network can simultaneously use different location area registration algorithms. The scheme used for a particular terminal is appropriately based upon the capabilities of the terminal (and the network) and is not limited to a particular predefined algorithm. Literally any type of registration scheme can be negotiated for, so long as it is supported by both the terminal and the network. For example, any of the registration schemes described above can be utilized simultaneously within a given network. Note, however, that if a particular network does not broadcast both location area identifiers and geographical coordinates, then all terminals within the network should use algorithms that are based on either location area identifiers or geographical coordinates, as appropriate. Also note that the schemes described above are merely exemplary and that any other presently available or yet to be developed scheme can be implemented as well.

Advantageously, the negotiation and renegotiation steps (i.e., steps 530 and 560) of the method of FIG. 4 can be implemented in a variety of ways. For example, known location area registration schemes can be numbered according to complexity level. A set of N available schemes, for instance, can be numbered 0 to N−1 with 0 representing the simplest scheme and N−1 the most complex. Thus, a mobile terminal can, for example, begin negotiating with a network by transferring the number corresponding to the highest level of registration complexity the terminal is equipped to implement. Thereafter, the network can either accept the level transmitted by the terminal or respond with a lower number corresponding to the highest level of complexity the network is equipped to implement. The highest, mutually agreeable level of complexity can then be used by both the terminal and the network.

Alternatively, the terminal and the network can indicate exactly which location area registration scheme, or schemes, they can implement. Where the terminal and the network transmit only one number, the number can be accompanied by a flag indicating whether the number represents the highest level of complexity supported or the only level of complexity supported.

Negotiation for a level of complexity and/or sophistication as described above can be extremely useful when a new communications standard is introduced. For example, early implementations of a standard can employ low complexity levels, and higher complexity levels can be gradually introduced in networks and terminals as is deemed necessary or appropriate. Additionally, new algorithms can be introduced within the standard as work with the algorithms proceeds and as experience with respect to the efficiency of different algorithms in already implemented systems is gained. The negotiation mechanism is also especially useful for partially upgraded networks. As described above, partial upgrading can be useful when it is desirable to gradually introduce improvements within an existing network (e.g., to accommodate heavily loaded parts of a network without having to upgrade the entire network). Advantageously, the described negotiation mechanism provides a vehicle by which such partially upgraded networks can be created with respect to location area registration.

When a mobile terminal roams from an area covered by an upgraded part of the network (using a relatively advanced location area registration scheme) to an area covered by a non-upgraded part of the network (using a simpler location area registration scheme), the terminal and the network renegotiate for a more suitable location area registration scheme as noted above. In some systems, the terminal can detect that the advanced registration scheme is not present based upon the broadcast system information. If so, the terminal can immediately initiate a renegotiation with the network. However, if the broadcast system information is insufficient for the terminal to detect that the advanced registration scheme is no longer present, then the terminal will first attempt a location update according to the prevailing (more advanced) registration scheme. When the network then rejects the location update attempt, the terminal can initiate a renegotiation. Alternatively, the network can initiate the renegotiation when rejecting the location update attempt (provided that the network recognizes the message from the terminal as a location update attempt).

When a mobile terminal roams from a non-upgraded network area (using a first location area scheme) to an upgraded network area (using both the first scheme and a more advanced scheme), the terminal can first attempt a location update according to the first location area scheme. The network can then instruct the terminal directly to start using the more advanced scheme (provided the terminal can support the more advanced scheme). To provide this functionality, the initial negotiation data (i.e., the data describing which location area registration schemes the terminal supports), can be stored within the network upon initial registration by the terminal. For example, the data can be included in the data structure many networks maintain with respect to individual terminals. If such information is not maintained by the network, the network can instead initiate a renegotiation with the terminal. Alternatively, if the terminal itself can detect the presence of the more advanced location area scheme based on the broadcast system information, then the terminal can initiate a renegotiation with the network.

Those skilled in the art will appreciate that the above described detailed methods for negotiating and renegotiating a location area registration scheme are provided for purposes of illustration and that numerous variations are contemplated herein. Broadly speaking, the present invention teaches that location area registration can be negotiated and that many benefits can be derived therefrom. The preferred method of implementation can vary depending upon the particular application at hand.

Those skilled in the art will also appreciate that the invention can be generalized to provide for negotiation of system aspects other than location area registration scheme. For example, a mobile terminal and a network can negotiate for a particular communications protocol (e.g., the Call Control and/or Radio Resource Control protocols). Indeed, a mobile terminal and a network can negotiate for the entire standard by which they will communicate. For example, they can negotiate for a particular version of a known standard in a manner analogous to that described above with respect to the level of complexity for a location area registration scheme. Doing so makes introduction of a new version of a standard still easier. For example, since multiple versions of a standard can coexist within a single network, newer versions of the standard need not be backward compatible with older versions.

In sum, the present invention provides a negotiation scheme which enables differently configured equipment to coexist and interwork within a single network. Thus, the present invention provides a vehicle for gradually introducing more advanced location area schemes, protocols and/or standards into implemented systems. Advantageously, when new schemes or standards are introduced, relatively low complexity levels can be utilized initially, and higher levels of complexity can be utilized as is necessary or appropriate. For example, new algorithms can be introduced within a standard as work with the algorithms proceeds and as experience with respect to the efficiency of the algorithms in implemented systems is gained.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

I claim:

1. A method of interfacing a communications network and a mobile terminal, comprising the steps of:
   negotiating, upon an initial registration by said mobile terminal with said network, a location area registration scheme for said mobile terminal; and
   using said location area registration scheme to track movement of said mobile terminal within a coverage area of said communications network,
   wherein said step of negotiating a location area registration scheme comprises the steps of:
      sending a first number from said mobile terminal to said network, said first number indicating a highest level of location area registration said mobile terminal can implement;
      receiving said first number at said network;
      comparing said received first number with a second number indicating a highest level of location area registration said network can implement;
      sending one of an acceptance message and said second number from said network to said terminal, wherein said acceptance message is sent when said network can implement a level of location area registration corresponding to said first number, and wherein said second number is sent when said network cannot implement a level of location area registration corresponding to said first number;
      receiving said one of said acceptance message and said second number at said terminal; and
      storing one of said first and second numbers at said terminal and at said network, wherein said first number is stored when said network can implement a level of location area registration corresponding to said first number, and wherein said second number is stored when said network cannot implement a level of location area registration corresponding to said first number.

2. The method of claim 1, wherein an initial negotiation message sent from said terminal to said network includes a flag indicating that said first number represents a highest level of location area registration said terminal can implement.

3. The method of claim 1, further comprising the step of storing said first number at said network.

4. A method of interfacing a communications network and a mobile terminal, comprising the steps of:
   negotiating, upon an initial registration by said mobile terminal with said network, a location area registration scheme for said mobile terminal; and
   using said location area registration scheme to track movement of said mobile terminal within a coverage area of said communications network, wherein said step of negotiating a location area registration scheme comprises the steps of:
      sending at least one number from said terminal to said network, each number indicating a level of location area registration said terminal can implement;
      receiving said at least one number at said network;
      comparing said at least one number with at least one other number, each other number indicating a level of location area registration said network can implement;
      sending an acceptance message with a result number indicating a highest level of location area registration that both said terminal and said network can implement from said network to said terminal when said network and said terminal can both implement at least one common level of location area registration, and sending a reject message from said network to said terminal when said network and said terminal cannot both implement at least one common level of location area registration;

receiving one of a) said acceptance message with said result number and b) said reject message at said terminal; and storing said result number at said terminal and at said network when said network and said terminal can both implement at least one common level of location area registration.

5. The method of claim 4, further comprising the step of storing, at said network, said at least one number sent from said terminal to said network.

6. A method of interfacing a communications network and a mobile terminal, comprising the steps of:

negotiating, upon an initial registration by said mobile terminal with said network, a location area registration scheme for said mobile terminal; and using said location area registration scheme to track movement of said mobile terminal within a coverage area of said communications network, wherein said step of negotiating a location area registration steps of:

sending a first number from said terminal to said network, said first number indicating a single specific level of location area registration which said terminal can implement;

receiving said first number at said network;

comparing said first number with at least one other number, each other number indicating a level of location area registration said network can implement;

sending an acceptance message from said network to said terminal when said network can implement said single specific level of location area registration, and sending a reject message from said network to said terminal when said network cannot implement said single specific level of location area registration;

receiving one of said acceptance message and said reject message at said terminal; and storing a negotiation result at said terminal and at said network.

7. The method of claim 6, wherein an initial negotiation message sent from said terminal to said network includes a flag indicating that said first number represents a single specific level of location area registration that said terminal can implement.

8. The method of claim 6, further comprising the step of storing said first number at said network.

9. A method of interfacing a communications network and a mobile terminal, comprising the steps of:

negotiating, upon an initial registration by said mobile terminal with said network, a location area registration scheme for said mobile terminal;

using said location area registration scheme to track movement of said mobile terminal within a coverage area of said communications network;

detecting, at said terminal, that said terminal has entered a coverage area in which said network does not support a location area registration scheme currently being implemented by said terminal;

initiating, from said terminal, a renegotiation of location area registration scheme with said network; and subsequently using a location area registration scheme, resulting from said renegotiation, to track movement of said mobile terminal within said entered coverage area.

10. A method of interfacing a communications network and a mobile terminal, comprising the steps of:

negotiating, upon an initial registration by said mobile terminal with said network, a location area registration scheme for said mobile terminal;

using said location area registration scheme to track movement of said mobile terminal within a coverage area of said communications network;

sending a location update request in accordance with a currently implemented location area registration scheme from said terminal to said network when said terminal enters a coverage area in which said network does not support said currently implemented location area registration scheme;

receiving said location update request at said network;

sending a location update reject message from said network to said terminal;

receiving said location update reject message at said terminal;

initiating, from said terminal, a renegotiation of location area registration scheme with said network; and subsequently using a location area registration scheme, resulting from said renegotiation, to track movement of said mobile terminal within said entered coverage area.

11. A method of interfacing a communications network and a mobile terminal, comprising the steps of:

negotiating, upon an initial registration by said mobile terminal with said network, a location area registration scheme for said mobile terminal;

using said location area registration scheme to track movement of said mobile terminal within a coverage area of said communications network;

sending a location update request in accordance with a currently implemented location area registration scheme from said terminal to said network when said terminal enters a coverage area in which said network does not support said currently implemented location area registration scheme;

receiving said location update request at said network;

sending a location update reject message from said network to said terminal;

initiating, from said network, a renegotiation of location area registration scheme with said terminal; and subsequently using a location area registration scheme, resulting from said renegotiation, to track movement of said mobile terminal within said entered coverage area.

12. The method of claim 11, wherein said renegotiation is initiated via said location update reject message.

13. The method of claim 11, wherein said renegotiation is initiated via a message separate from said location update reject message.

14. A method of interfacing a communications network and a mobile terminal, comprising the steps of:

negotiating, upon an initial registration by said mobile terminal with said network, a location area registration scheme for said mobile terminal;

using said location area registration scheme to track movement of said mobile terminal within a coverage area of said communications network;

sending a location update request in accordance with a currently implemented location area registration scheme from said terminal to said network when said terminal enters a coverage area in which said network supports a level of location area registration which is higher than a level of said currently implemented location area registration scheme;

receiving said location update request at said network;

comparing, at said network, stored negotiation information relating to levels of location area registration supported by said terminal with levels of location area registration supported by said network within said entered coverage area;

sending a message from said network to said terminal when said terminal and said network can both implement a level of location area registration within said entered coverage area which is higher than the level of said currently implemented location area registration scheme, said message instructing said terminal to begin implementing said higher level of location area registration; and subsequently using said higher level of location area registration to track movement of said mobile terminal within said entered coverage area.

15. A method of interfacing a communications network and a mobile terminal, comprising the steps of:

negotiating, upon an initial registration by said mobile terminal with said network, a location area registration scheme for said mobile terminal;

using said location area registration scheme to track movement of said mobile terminal within a coverage area of said communications network;

detecting, at said terminal, that said terminal has entered a coverage area in which said terminal and said network can both support a level of location area registration that is higher than a level of location area registration currently being implemented;

initiating, from said terminal, a renegotiation of location area registration scheme with said network; and subsequently using a location area registration scheme, resulting from said renegotiation, to track movement of said mobile terminal within said entered coverage area.

16. A wireless communications system, comprising:

a network of base stations; and at least one mobile station, wherein said network and said at least one mobile station comprise means for negotiating, upon an initial registration with said network by said mobile station, a location area registration scheme for tracking movement of said mobile station within a coverage area of said network, wherein said one mobile station further comprises means for detecting that said mobile station has entered a coverage area in which said mobile station and said network can both support a level of location area registration that is higher than a level of location area registration currently being implemented, and comprises means for initiating a renegotiation of location area registration scheme with said network;

wherein a location area registration scheme, resulting from said renegotiation, is subsequently used to track movement of said mobile terminal within said entered coverage area.

17. A method of interfacing a communications network and a mobile terminal, comprising the steps of:

negotiating, upon an initial registration by said mobile terminal with said network, an interface protocol to be used for said mobile terminal; and using said interface protocol to conduct communications between said mobile terminal and said network;

wherein said step of negotiating an interface protocol comprises the steps of:

sending a first number from said mobile terminal to said network, said first number indicating a highest version of said interface protocol that said mobile terminal can implement;

receiving said first number at said network;

comparing said received first number with a second number indicating a highest version of said interface protocol that said network can implement;

sending one of an acceptance message and said second number from said network to said terminal, wherein said acceptance message is sent when said network can implement a version of said interface protocol corresponding to said first number, and wherein said second number is sent when said network cannot implement a version of said interface protocol corresponding to said first number;

receiving said one of said acceptance message and said second number at said terminal; and storing the lesser of said first and second numbers at said terminal and at said network.

18. The method of claim 21, wherein said interface protocol is a Call Control protocol.

19. The method of claim 21, wherein said interface protocol is a Radio Resource Control protocol.

20. A method of interfacing a communications network and a mobile terminal, comprising the steps of:

negotiating, upon an initial registration by said mobile terminal with said network, a communications standard to be used for said mobile terminal; and using said communications standard to conduct communications between said mobile terminal and said network;

wherein said step of negotiating a communications standard comprises the steps of:

sending a first number from said mobile terminal to said network, said first number indicating a highest version of said standard that said mobile terminal can implement;

receiving said first number at said network;

comparing said received first number with a second number indicating a highest version of said standard that said network can implement;

sending one of an acceptance message and said second number from said network to said terminal, wherein said acceptance message is sent when said network can implement a version of said standard corresponding to said first number, and wherein said second number is sent when said network cannot implement a version of said standard corresponding to said first number;

receiving said one of said acceptance message and said second number at said terminal; and storing the lesser of said first and second numbers at said terminal and at said network.

* * * * *